United States Patent
Peng et al.

(10) Patent No.: US 9,882,822 B2
(45) Date of Patent: Jan. 30, 2018

(54) DATA FRAME SENDING METHOD AND APPARATUS

(71) Applicant: Huawei Technologies Co., Ltd., Shenzhen (CN)

(72) Inventors: Jun Peng, Suzhou (CN); Jin Wang, Suzhou (CN); Lin Zhang, Suzhou (CN); Keming Zhao, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 87 days.

(21) Appl. No.: 14/984,474

(22) Filed: Dec. 30, 2015

(65) Prior Publication Data

US 2016/0191403 A1    Jun. 30, 2016

(30) Foreign Application Priority Data

Dec. 31, 2014    (CN) .......................... 2014 1 0849983

(51) Int. Cl.
| | |
|---|---|
| *H04L 12/891* | (2013.01) |
| *H04W 28/02* | (2009.01) |
| *H04W 72/12* | (2009.01) |
| *H04L 1/00* | (2006.01) |
| *H04W 28/06* | (2009.01) |
| *H04L 1/18* | (2006.01) |

(52) U.S. Cl.
CPC ............ *H04L 47/41* (2013.01); *H04L 1/0002* (2013.01); *H04L 1/0007* (2013.01); *H04L 1/0015* (2013.01); *H04L 1/1867* (2013.01); *H04W 28/0273* (2013.01); *H04W 28/065* (2013.01); *H04W 72/12* (2013.01)

(58) Field of Classification Search
CPC .... H04L 47/41; H04W 28/0273; H04W 72/12
See application file for complete search history.

(56) References Cited

U.S. PATENT DOCUMENTS

| | | |
|---|---|---|
| 8,184,551 B2 | 5/2012 | Hu et al. |
| 2007/0280130 A1 | 12/2007 | Matsuo |

(Continued)

OTHER PUBLICATIONS

Foreign Communication From a Counterpart Application, European Application No. 15202178.8, Extended European Search Report dated Apr. 26, 2016, 7 pages.

(Continued)

*Primary Examiner* — Eric Myers
(74) *Attorney, Agent, or Firm* — Conley Rose, P.C.

(57) ABSTRACT

A data frame sending method and apparatus for effectively improving sending efficiency by, acquiring a basic speed set, determining a current sending speed which is the maximum speed in a candidate speed set, and the candidate speed set is the set of elements from the basic speed set and whose packet sending success rate is greater than a threshold, acquiring an aggregation length value according to the current sending speed, where the aggregation length value is the maximum length of a frame that can be sent at the current sending speed, determining multiple medium access control (MAC) protocol data units (MPDUs) from to-be-sent MPDUs according to the aggregation length value, and aggregating the multiple MPDUs to obtain an aggregate MAC protocol data unit (A-MPDU), where a length of the A-MPDU is less than or equal to the aggregation length value, and sending the A-MPDU at the current sending speed.

15 Claims, 4 Drawing Sheets

(56) References Cited

U.S. PATENT DOCUMENTS

2007/0280181 A1 12/2007 Matsuo et al.
2012/0314636 A1 12/2012 Liu
2014/0254408 A1 9/2014 Shukla et al.

OTHER PUBLICATIONS

"Part 11: Wireless LAN Medium Access Control (MAC) and Physical Layer (PHY) Specifications," IEEE Computer Society, Std 802.11, Mar. 29, 2012, 2793 pages.

DATA FRAME SENDING METHOD AND APPARATUS

CROSS-REFERENCE TO RELATED APPLICATION

This application claims priority to Chinese Patent Application No. 201410849983.6, filed on Dec. 31, 2014, which is hereby incorporated by reference in its entirety.

TECHNICAL FIELD

This application relates to the field of communications technologies, and in particular, to a data frame sending method and apparatus.

BACKGROUND

A wireless local area network (WLAN) may send data frames in an aggregation manner. Specifically, multiple medium access control (MAC) protocol data units sent to a same receiver address (RA) are aggregated to obtain an aggregate MAC protocol data unit (A-MPDU), and the A-MPDU is sent. A receive end responds to the A-MPDU using a block acknowledgment, which can reduce overheads. In a process of sending MPDUs in a frame aggregation manner, an upper limit of a length of an A-MPDU needs to be first determined.

Conventionally, a method for determining an upper limit of a length of an A-MPDU is: selecting a minimum speed from several basic speeds so as to use a length value of MPDUs that can be sent at the minimum speed as the upper limit of the length of the A-MPDU. An upper limit of a length of an A-MPDU is acquired always at a minimum speed each time, but the upper limit value is excessively small, and a length of each MPDU is fixed; as a result, a quantity of MPDUs that can be aggregated at a time is relatively small.

SUMMARY

Embodiments of the present disclosure provide a data frame sending method and apparatus, which are used to improve sending efficiency.

According to a first aspect, the present disclosure provides a data frame sending method, which may mainly include: acquiring a basic speed set; determining a current sending speed, where the current sending speed is an element with a maximum speed in a candidate speed set, and the candidate speed set is a set of elements that are in the basic speed set and whose packet sending success rate is greater than or equal to a packet sending success rate threshold; acquiring an aggregation length value according to the current sending speed, where the aggregation length value is a maximum length of a frame that can be sent at the current sending speed; determining multiple MPDUs from to-be-sent MPDUs according to the aggregation length value, and aggregating the multiple MPDUs to obtain an A-MPDU, where a length of the A-MPDU is less than or equal to the aggregation length value; and sending the A-MPDU at the current sending speed.

With reference to the first aspect, in a first possible implementation manner of the first aspect, after the step of sending the A-MPDU at the current sending speed, the method further includes: when the A-MPDU is sent successfully, adjusting upward a packet sending success rate of the current sending speed; or when the A-MPDU fails to be sent, adjusting downward a packet sending success rate of the current sending speed.

With reference to the first aspect or the first possible implementation manner of the first aspect, in a second possible implementation manner of the first aspect, when the A-MPDU fails to be sent at the current sending speed, the method further includes: determining a quantity of sending failures for sending the A-MPDU at the current sending speed; and when the quantity of sending failures is less than a failure quantity threshold, resending the A-MPDU at the current sending speed.

With reference to the first aspect or either one of the first possible implementation manner and the second possible implementation manner of the first aspect, in a third possible implementation manner of the first aspect, when the quantity of sending failures is equal to the failure quantity threshold, the method further includes: determining a next-order speed that is of the current sending speed and in the candidate speed set as a new current sending speed; acquiring a new aggregation length value according to the new current sending speed, where the new aggregation length value is a length of a frame that can be sent at the new current sending speed within a preset period of time; determining multiple new MPDUs from the to-be-sent MPDUs according to the new aggregation length value, and aggregating the multiple new MPDUs to obtain a new A-MPDU, where a length of the new A-MPDU is less than or equal to the aggregation length value; and sending the new A-MPDU at the current sending speed.

With reference to the first aspect or any one of the first possible implementation manner to the third possible implementation manner of the first aspect, in a fourth possible implementation manner of the first aspect, when the A-MPDU is sent successfully at the current sending speed, adding a first value to the packet sending success rate of the current sending speed; when the quantity of sending failures for sending the A-MPDU at the current sending speed is less than the failure quantity threshold, adding a second value to the packet sending success rate of the current sending speed, where the first value is greater than the second value, an initial value of the packet sending success rate of the current sending speed is an upper limit value, and a packet sending success rate of the current sending speed after being added with the first value or the second value does not exceed the upper limit value; and when the quantity of sending failures for sending the A-MPDU at the current sending speed is equal to the failure quantity threshold, subtracting a third value from the packet sending success rate of the current sending speed.

According to a second aspect, the present disclosure provides a data frame sending apparatus, which may mainly include: a first acquiring unit configured to acquire a basic speed set; a determining unit configured to determine a current sending speed, where the current sending speed is an element with a maximum speed in a candidate speed set, and the candidate speed set is a set of elements that are in the basic speed set acquired by the first acquiring unit and whose packet sending success rate is greater than or equal to a packet sending success rate threshold; a second acquiring unit configured to acquire an aggregation length value according to the current sending speed determined by the determining unit, where the aggregation length value is a maximum length of a medium access control protocol data unit MPDU that can be sent at the current sending speed; an aggregation unit configured to determine multiple MPDUs from to-be-sent MPDUs according to the aggregation length value acquired by the second acquiring unit, and aggregate the multiple MPDUs to obtain an aggregate medium access control protocol data unit A-MPDU, where a length of the A-MPDU is less than or equal to the aggregation length value; and a sending unit configured to send, at the current sending speed, the A-MPDU obtained by performing aggregation by the aggregation unit.

With reference to the second aspect, in a first possible implementation manner of the second aspect, the apparatus may further include: an adjustment unit configured to: when the A-MPDU is sent successfully, adjust upward a packet sending success rate of the current sending speed; or when the A-MPDU fails to be sent, adjust downward a packet sending success rate of the current sending speed.

With reference to the first possible implementation manner of the second aspect, in a second possible implementation manner, the adjustment unit is further configured to: when the A-MPDU is sent successfully, add a first value to the packet sending success rate of the current sending speed; when a quantity of sending failures for sending the A-MPDU is less than a failure quantity threshold, add a second value to the packet sending success rate of the current sending speed, where the first value is greater than the second value, an initial value of the packet sending success rate of the current sending speed is an upper limit value, and a packet sending success rate of the current sending speed after being added with the first value or the second value does not exceed the upper limit value; and when the quantity of sending failures for sending the A-MPDU is equal to the failure quantity threshold, subtract a third value from the packet sending success rate of the current sending speed.

With reference to the first possible implementation manner or the second possible implementation manner of the second aspect, in a third possible implementation manner, the sending unit is further configured to: when the quantity of sending failures for sending the A-MPDU at the current sending speed is less than the failure quantity threshold, resend the A-MPDU at the current sending speed.

With reference to the first possible implementation manner or the second possible implementation manner of the second aspect, in a fourth possible implementation manner, the sending unit is further configured to: when the quantity of sending failures for sending the A-MPDU at the current sending speed is equal to the failure quantity threshold, determine a next-order speed that is of the current sending speed and in the candidate speed set as a new current sending speed; acquire a new aggregation length value according to the new current sending speed, where the new aggregation length value is a length of a frame that can be sent at the new current sending speed within a preset period of time; determine multiple new MPDUs from the to-be-sent MPDUs according to the new aggregation length value, and aggregate the multiple new MPDUs to obtain a new A-MPDU, where a length of the new A-MPDU is less than or equal to the aggregation length value; and send the new A-MPDU at the current sending speed.

It can be seen from the foregoing technical solutions that, the embodiments of the present disclosure have the following advantages.

According to the embodiments of the present disclosure, a maximum speed is dynamically selected from a basic speed set in which a packet sending success rate is greater than or equal to a packet sending success rate threshold to acquire an aggregation length value, and compared with that a minimum speed is always selected in the conventional solution, the aggregation length value is effectively increased. Therefore, a quantity of MPDUs in an A-MPDU can be increased. On the premise that MPDUs of a same quantity need to be sent, compared with the conventional solution, in the present disclosure, more MPDUs can be aggregated during each time of frame aggregation, and a quantity of sending times can be effectively reduced, thereby effectively improving sending efficiency.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person skilled in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

The embodiments of the present disclosure provide a data frame sending method, and the embodiments of the present disclosure further provide a corresponding data frame sending apparatus. Referring to FIG. 1 to FIG. 5, the following provides detailed descriptions separately using specific embodiments.

The data frame sending method provided in the embodiments of the present disclosure is applicable to a WLAN system, for example, the method may be applied to data communication based on a WLAN protocol.

A data frame sending method may mainly include acquiring a basic speed set; determining a current sending speed, where the current sending speed is an element with a maximum speed in a candidate speed set, and the candidate speed set is a set of elements that are in the basic speed set and whose packet sending success rate is greater than or equal to a packet sending success rate threshold; acquiring an aggregation length value according to the current sending speed, where the aggregation length value is a maximum length of an MPDU that can be sent at the current sending speed; determining multiple MPDUs from to-be-sent MPDUs according to the aggregation length value, and aggregating the multiple MPDUs to obtain an A-MPDU, where a length of the A-MPDU is less than or equal to the aggregation length value; and sending the A-MPDU at the current sending speed.

Figure 1:
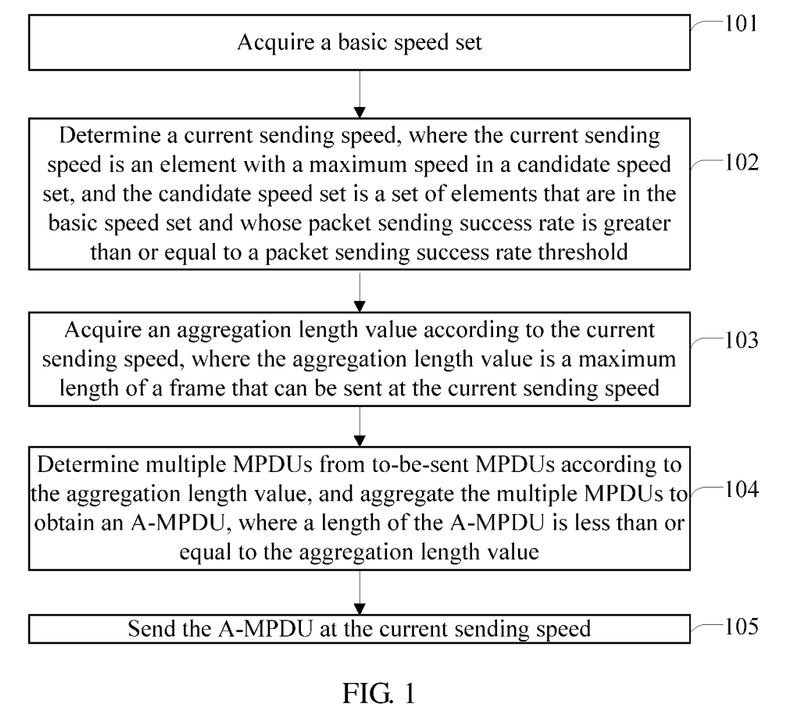
FIG. 1 is a schematic flowchart of a data frame sending method according to an embodiment of the present disclosure.

Referring to FIG. 1, FIG. 1 is a schematic flowchart of a data frame sending method according to an embodiment of the present disclosure, where the method may specifically include the following steps:

Step 101: Acquire a basic speed set.

Elements in the basic speed set may be all possible sending speeds. The elements in the basic speed set may also be multiple sending speeds selected from all possible sending speeds. For example, multiple sending speeds may be selected from all possible sending speeds according to a conventional speed selection algorithm and be used as the elements of the basic speed set. The following describes the sending method in this embodiment of the present disclosure using an example in which there are four elements in the basic speed set, and the four elements are V1, V2, V3, and V4 separately, where speeds of V1, V2, V3, and V4 are in a descending order.

Step 102: Determine a current sending speed, where the current sending speed is an element with a maximum speed in a candidate speed set, and the candidate speed set is a set of elements that are in the basic speed set and whose packet sending success rate is greater than or equal to a packet sending success rate threshold.

Each of the elements (for example, V1, V2, V3, and V4) in the basic speed set has a packet sending success rate, and an element that is in the basic speed set and whose packet sending success rate is greater than or equal to the packet sending success rate threshold is selected as the candidate speed set. Therefore, the candidate speed set is a subset of the basic speed set. The packet sending success rate threshold may be user-defined. For example, the packet sending success rate threshold may be 80, 90, or the like. This embodiment of the present disclosure is described in detail using an example in which the packet sending success rate threshold is 80. Possible values of all variables in a computer are discrete, and therefore, the packet sending success rate is greater than or equal to a packet sending success rate threshold, which is the same as the packet sending success rate being greater than a lower packet sending success rate threshold. For example, if a possible packet sending success rate threshold is an integer, being greater than or equal to 80 is the same as being greater than 79; when a possible packet sending success rate threshold is a real number accurate to 8 decimal places, being greater than or equal to 80 is the same as being greater than 79.99999999.

An initial value of the packet sending success rate of each element in the basic speed set (V1, V2, V3, and V4) is an upper limit value, for example, 100. In this case, when elements in the candidate speed set are determined for the first time, all elements (V1, V2, V3, and V4) in the basic speed set are the elements in the candidate speed set.

The current sending speed is a maximum speed among V1, V2, V3, and V4, that is, V1.

Step 103: Acquire an aggregation length value according to the current sending speed, where the aggregation length value is a maximum length of a frame that can be sent at the current sending speed.

The aggregation length value may be obtained according to the current sending speed, and the maximum length of the frame that can be sent may be affected by various factors such as a transmission opportunity (TXOP). The aggregation length value is a maximum length of a frame that can be sent at the current sending speed within a TXOP, where the TXOP is time duration, for example, a TXOP is 4 milliseconds in Japan, that is, the aggregation length value is a maximum length of a frame that can be sent at the current sending speed within duration of 4 milliseconds.

In order to increase the aggregation length value, on a channel on which a TXOP is not limited to 4 milliseconds, 4 milliseconds is not used as one TXOP. Instead, the TXOP is prolonged properly, for example, 5 milliseconds, 5.5 milliseconds, 6 milliseconds, or the like. Preferably, the aggregation length value in this embodiment is a length of a frame that can be sent at the current sending speed within 5.5 milliseconds.

Step 104: Determine multiple MPDUs from to-be-sent MPDUs according to the aggregation length value, and aggregate the multiple MPDUs to obtain an A-MPDU, where a length of the A-MPDU is less than or equal to the aggregation length value.

The multiple MPDUs determined from the to-be-sent MPDUs may be aggregated according to the aggregation length value to obtain the A-MPDU, and the aggregation length value is an upper limit of the length of the A-MPDU.

For example, there are in total five MPDUs that are currently to be sent, namely, a, b, c, d, and e, and lengths of the five MPDUs are 25 bytes, 30 bytes, 35 bytes, 40 bytes, and 50 bytes in order. If the aggregation length value is 100 bytes, the three MPDUs a, b, and c (a total length is 90 bytes) may be aggregated this time to obtain the A-MPDU. If the aggregation length value is 200 bytes, the five MPDUs a, b, c, d, and e (a total length is 180 bytes) may be aggregated this time to obtain the A-MPDU.

Therefore, it can be seen that, in a case in which a sorting order and lengths of the MPDUs are fixed, a greater aggregation length value indicates a larger quantity of MPDUs that can be aggregated, and a quantity of times for sending the MPDUs can be effectively reduced, thereby effectively improving sending efficiency of the MPDUs.

Step 105: Send the A-MPDU at the current sending speed.

The A-MPDU is sent at the foregoing determined maximum speed in the candidate speed set.

According to this embodiment of the present disclosure, a maximum speed is dynamically selected from a basic speed set in which a packet sending success rate is greater than or equal to a packet sending success rate threshold to acquire an aggregation length value, and compared with that a minimum speed is always selected in the conventional solution. The aggregation length value is effectively increased. Therefore, a quantity of MPDUs in an A-MPDU can be increased. On the premise that MPDUs of a same quantity need to be sent, compared with the conventional solution, in the present disclosure, more MPDUs can be aggregated during each time of frame aggregation, and a quantity of sending times can be effectively reduced, thereby effectively improving sending efficiency.

Further, in step 105, the A-MPDU is sent at the current sending speed, and the A-MPDU may be sent successfully, or may fail to be sent.

When the A-MPDU fails to be sent at the current sending speed, but a quantity of sending failures is within a range of a failure quantity threshold, the A-MPDU may be retransmitted at the current sending speed. When a quantity of failures is equal to a failure quantity threshold, another speed is used as a new current sending speed to send the A-MPDU, where the new current sending speed is a maximum speed among other speeds in the candidate speed set except the speed at which the A-MPDU fails to be sent, that is, a next-order speed that is of the current sending speed and the candidate speed set is selected and determined as the new current sending speed. The failure quantity threshold may be user-defined, for example, may be set to 10. Alternatively, once the A-MPDU fails to be sent, the A-MPDU may be no longer retransmitted at the current sending speed, that is, the failure quantity threshold may be set to 1.

In addition, in this embodiment, the packet sending success rate of the current sending speed is adjusted according to the sending result, where the adjustment may include when the A-MPDU is sent successfully, adjusting upward the packet sending success rate of the current sending speed; or when the A-MPDU fails to be sent, adjusting downward the packet sending success rate of the current sending speed. For example, when a ratio of a quantity of times of successful packet sending to a total quantity of times of packet sending is used as the packet sending success rate, packet sending is successful, and a packet sending success rate before this successful packet sending is 90/100, a packet sending success rate after the successful packet sending is 91/101. For another example, a score may be used as the packet sending success rate; each time packet sending is successful, a fixed value is added to the packet sending success rate, for example, 5 is added. For example, when packet sending is successful, and a packet sending success rate before this successful packet sending is 90, after the packet sending success rate is adjusted upward by 5, the packet sending success rate is 95.

Further, in order to prevent multiple sending failures from causing an excessively low packet sending success rate of each element in the basic speed set, packet sending success rates of all basic speeds may be adjusted upward periodically. For example, a value may be added to original packet sending success rates of all basic speeds every 20 milliseconds, where a specific adjustment range may be user-defined.

The following describes embodiments of the present disclosure in detail with reference to adjustment of a packet sending success rate of a current sending speed.

Figure 2:
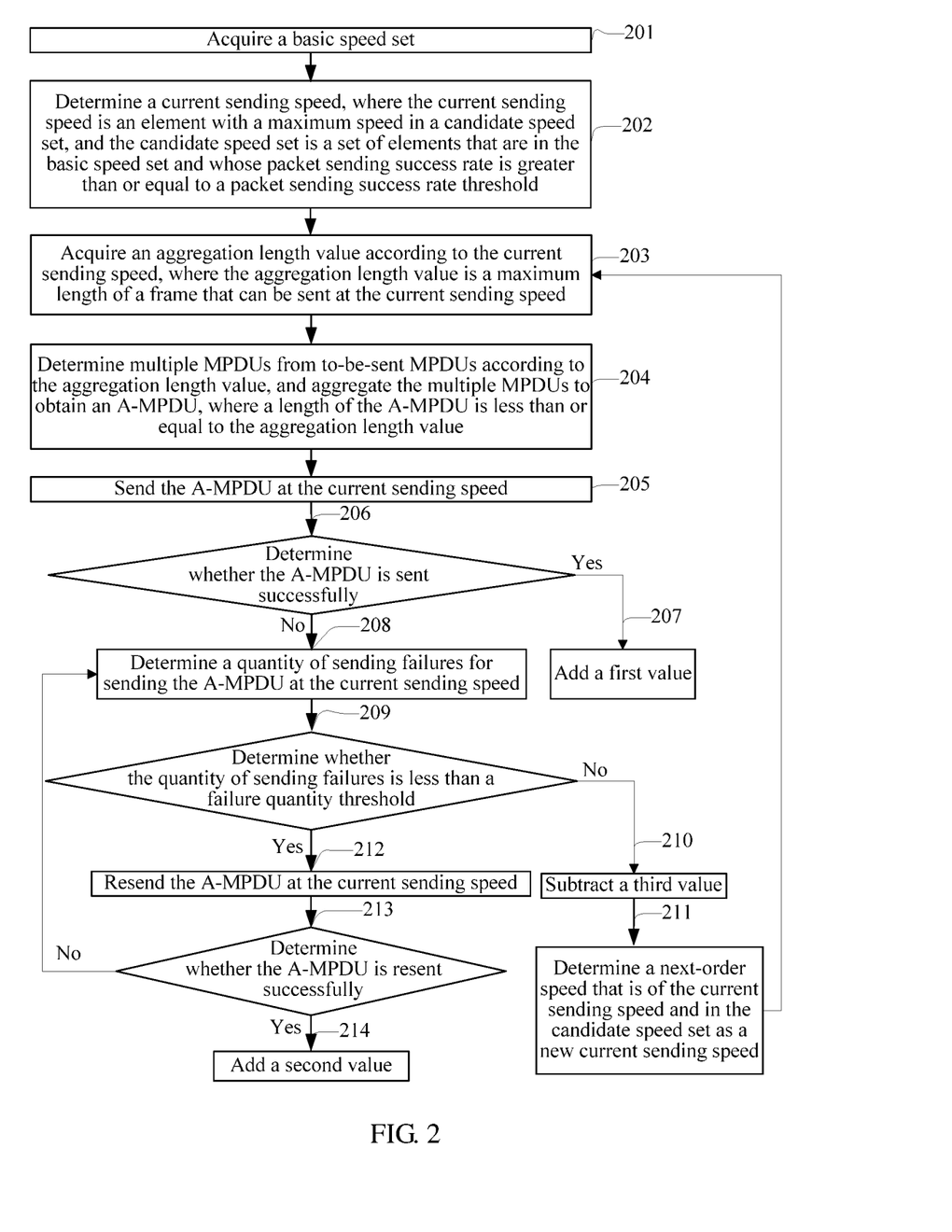
FIG. 2 is another schematic flowchart of a data frame sending method according to an embodiment of the present disclosure.

Referring to FIG. 2, FIG. 2 is another schematic flowchart of a data frame sending method according to the present disclosure. The method may mainly include:

Step 201: Acquire a basic speed set.

Step 202: Determine a current sending speed, where the current sending speed is an element with a maximum speed in a candidate speed set, and the candidate speed set is a set of elements that are in the basic speed set and whose packet sending success rate is greater than or equal to a packet sending success rate threshold.

Step 203: Acquire an aggregation length value according to the current sending speed, where the aggregation length value is a maximum length of a frame that can be sent at the current sending speed.

Step 204: Determine multiple MPDUs from to-be-sent MPDUs according to the aggregation length value, and aggregate the multiple MPDUs to obtain an A-MPDU, where a length of the A-MPDU is less than or equal to the aggregation length value.

Step 205: Send the A-MPDU at the current sending speed.

For specific implementation of step 201 to step 205, reference may be made to step 101 to step 105, and details are not described herein again.

Step 206: Determine whether the A-MPDU is sent successfully.

When sending is successful, step 207 is performed. When sending fails, step 208 is performed.

Step 207: When sending is successful, add a first value to a packet sending success rate of the current sending speed.

When the A-MPDU is sent successfully at the current sending speed at the first time, the first value is added to the packet sending success rate of the current sending speed, next frame aggregation is performed, and an A-MPDU is sent, that is, step 201 is performed again.

Optionally, if the A-MPDU is sent successfully, the first value may be added to the packet sending success rate. For example, a first value 30 may be directly added to an original packet sending success rate.

It should be noted that an initial value of the packet sending success rate of the current sending speed is an upper limit value, and a packet sending success rate obtained after the first value is added does not exceed the upper limit value. For example, when an original packet sending success rate of the current sending speed is 100, after 30 is added, a packet sending success rate of the current sending speed is still 100.

Step 208: If sending fails, determine a quantity of sending failures for sending the A-MPDU at the current sending speed.

Step 209: Determine whether the quantity of sending failures is less than a failure quantity threshold.

When the quantity of sending failures is greater than or equal to the failure quantity threshold, step 210 and step 211 are performed. When the quantity of sending failures is less than the failure quantity threshold, step 212 is performed.

Step 210: When the quantity of sending failures is equal to the failure quantity threshold, subtract a third value from a packet sending success rate of the current sending speed.

For example, a third value 12 may be directly subtracted from an original packet sending success rate.

Step 211: Determine a next-order speed that is of the current sending speed and in the candidate speed set as a new current sending speed.

After the new current sending speed is determined, a new aggregation length value is acquired according to the new current sending speed, where the new aggregation length value is a length of a frame that can be sent at the new current sending speed within a preset period of time. Multiple new MPDUs are determined from to-be-sent MPDUs according to the new aggregation length value, and the multiple new MPDUs are aggregated to obtain a new A-MPDU, where a length of the new A-MPDU is less than or equal to the aggregation length value. The new A-MPDU is sent at the current sending speed. That is, step 203 to step 205 are performed again.

Because the A-MPDU fails to be sent using the element with the maximum speed in the candidate speed set, the A-MPDU continues to be sent using an element with a second maximum speed as the current sending speed Implementation of sending the A-MPDU at the new current sending speed is similar to that in this embodiment, that is, step 206 continues to be performed after step 211.

Step 210 and step 211 are executed regardless of a sequence.

Step 212: When the quantity of sending failures is less than the failure quantity threshold, resend the A-MPDU at the current sending speed.

Step 213: Determine whether the A-MPDU is resent successfully.

When resending is successful, step 214 is performed, and when resending fails, step 208 is performed.

Step 214: When resending is successful, add a second value to a packet sending success rate of the current sending speed.

A second value is added to the packet sending success rate of the current sending speed when the sending is performed successfully at the current sending speed after multiple times. A speed with better quality can be selected during next frame aggregation, given that a first value added in a case in which the A-MPDU is sent successfully at the first time is greater than the second value added in a case in which the A-MPDU is sent successfully after multiple times. For example, a second value 15 may be directly added to an original packet sending success rate.

It should be noted that an initial value of the packet sending success rate of the current sending speed is an upper limit value, and a packet sending success rate obtained after the second value is added does not exceed the upper limit value. For example, when an original packet sending success rate of the current sending speed is 100, after the second value is added, a packet sending success rate of the current sending speed is still 100.

Figure 3:
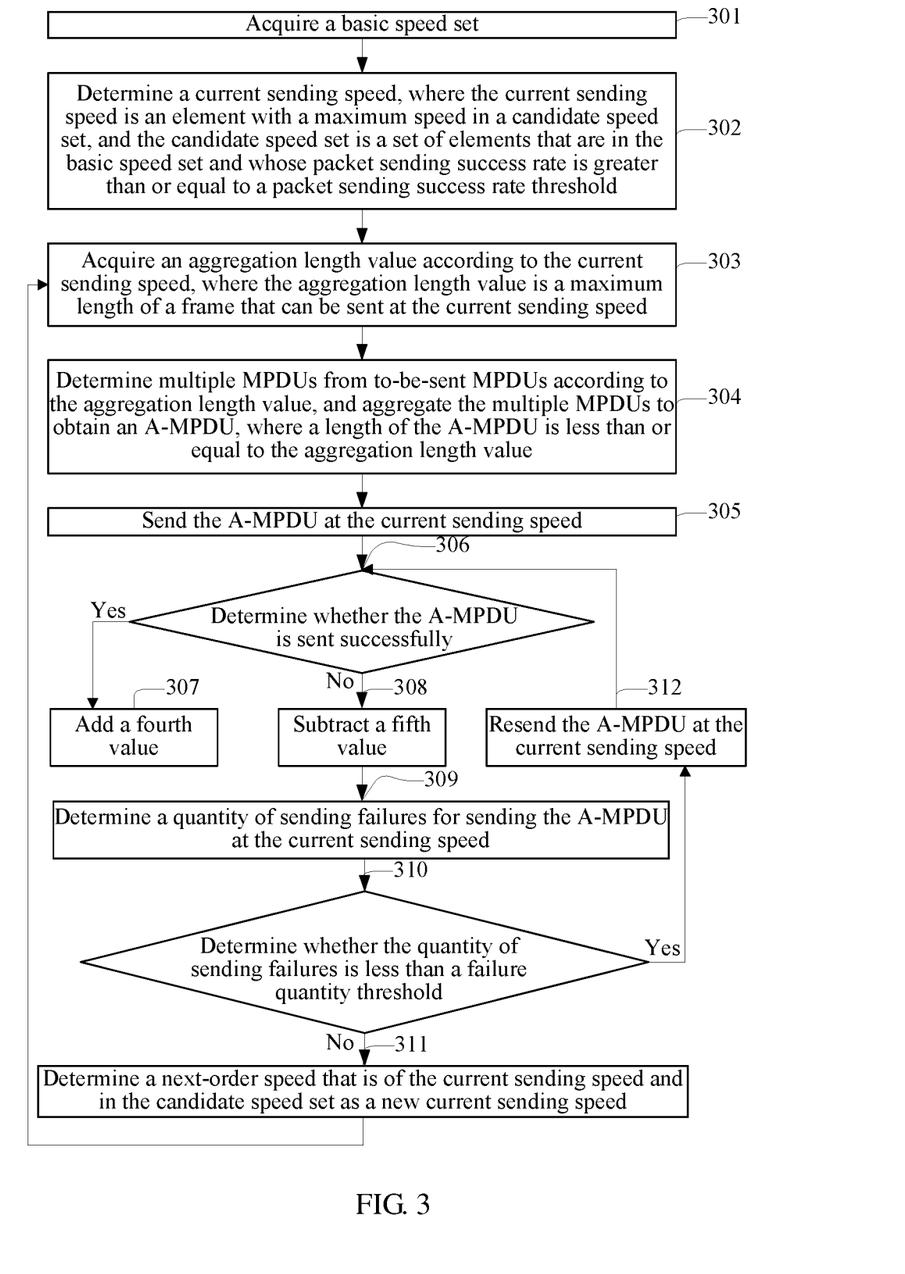
FIG. 3 is still another schematic flowchart of a data frame sending method according to an embodiment of the present disclosure.

Referring to FIG. 3, FIG. 3 is another schematic flowchart of a data frame sending method according to the present disclosure. The method may mainly include:

For specific implementation of step 301 to step 305, reference may be made to step 201 to step 205, and details are not described herein again.

Step 306: Determine whether an A-MPDU is sent successfully.

When sending is successful, step 307 is performed. When sending fails, step 308 is performed.

Step 307: When sending is successful, add a fourth value to a packet sending success rate of a current sending speed.

When the A-MPDU is sent successfully at the current sending speed, the packet sending success rate of the current sending speed is adjusted upward by the fourth value, where an initial value of the packet sending success rate of the current sending speed is an upper limit value, and a packet sending success rate of the current sending speed after being adjusted upward does not exceed the upper limit value.

Optionally, the fourth value may be any value, or be any proportional value of an original packet sending success rate, which is not limited in the present disclosure.

Step 308: If sending fails, subtract a fifth value from a packet sending success rate of a current sending speed.

If the A-MPDU fails to be sent at the current sending speed, the fifth value is subtracted from the packet sending success rate of the current sending speed.

Optionally, the fifth value may be any value, or be any proportional value of an original packet sending success rate, which is not limited in the present disclosure.

Step 309: Determine a quantity of sending failures for sending the A-MPDU at the current sending speed.

Step 310: Determine whether the quantity of sending failures is less than a failure quantity threshold.

When the quantity of sending failures is equal to the failure quantity threshold, step 311 is performed. When the quantity of sending failures is less than the failure quantity threshold, step 312 is performed.

Step 311: Determine a next-order speed that is of the current sending speed and in the candidate speed set as a new current sending speed.

After the new current sending speed is determined, a new aggregation length value is acquired according to the new current sending speed, where the new aggregation length value is a length of a frame that can be sent at the new current sending speed within a preset period of time. Multiple, new MPDUs are determined from to-be-sent MPDUs according to the new aggregation length value, and the multiple new MPDUs are aggregated to obtain a new A-MPDU, where a length of the new A-MPDU is less than or equal to the aggregation length value. Additionally the new A-MPDU is sent at the current sending speed. That is, step 303 to step 305 are performed again.

Because the A-MPDU fails to be sent using the element with the maximum speed in the candidate speed set, the A-MPDU continues to be sent using an element with a second maximum speed as the current sending speed Implementation of sending the A-MPDU at the new current sending speed is similar to that in this embodiment, that is, step 306 continues to be performed after step 311.

Step 312: When the quantity of sending failures is less than the failure quantity threshold, resend the A-MPDU at the current sending speed.

In addition, step 306 is performed again, that is, whether the A-MPDU is sent successfully is determined. When the A-MPDU is sent successfully, step 307 is performed. When the A-MPDU fails to be sent, step 308 is performed, and so on.

In order to better implement the data frame sending method provided in the embodiments of the present disclosure, an embodiment of the present disclosure further provides an apparatus that is based on the foregoing data frame sending method. Meanings of terms are the same as those in the foregoing data frame sending method, and for specific implementation details, reference may be made to the descriptions in the method embodiments.

Figure 4:
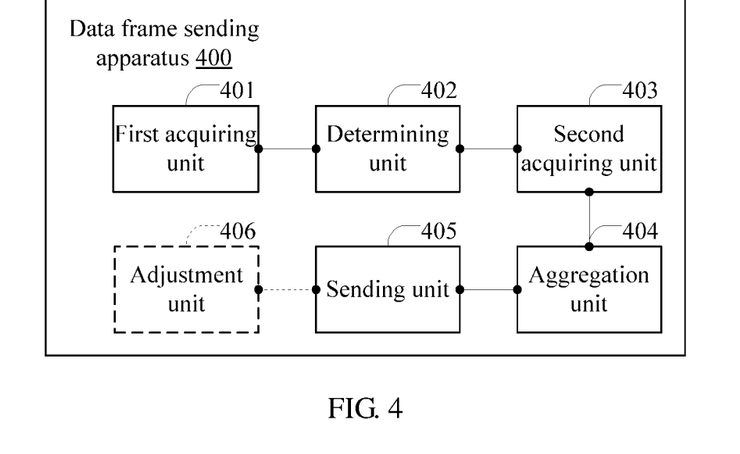
FIG. 4 is a schematic structural diagram of a data frame sending apparatus according to an embodiment of the present disclosure.

Referring to FIG. 4, FIG. 4 is a schematic structural diagram of a data frame sending apparatus, where the data frame sending apparatus 400 may specifically include a first acquiring unit 401, a determining unit 402, a second acquiring unit 403, an aggregation unit 404, and a sending unit 405.

The first acquiring unit 401 is configured to acquire a basic speed set.

The determining unit 402 is configured to determine a current sending speed, where the current sending speed is an element with a maximum speed in a candidate speed set, and the candidate speed set is a set of elements that are in the basic speed set acquired by the first acquiring unit 401 and whose packet sending success rate is greater than or equal to a packet sending success rate threshold.

The second acquiring unit 403 is configured to acquire an aggregation length value according to the current sending speed determined by the determining unit 402, where the aggregation length value is a maximum length of a frame that can be sent at the current sending speed.

The aggregation unit 404 is configured to determine multiple MPDUs from to-be-sent MPDUs according to the aggregation length value acquired by the second acquiring unit 403, and aggregate the multiple MPDUs to obtain an A-MPDU, where a length of the A-MPDU is less than or equal to the aggregation length value.

The sending unit 405 is configured to send, at the current sending speed, the A-MPDU obtained by performing aggregation by the aggregation unit 404.

Further, the sending unit 405 may send the A-MPDU successfully or may fail to send the A-MPDU. When the A-MPDU fails to be sent at the current sending speed, but a quantity of sending failures is within a range of a failure quantity threshold, the A-MPDU may be retransmitted at the current sending speed. When a quantity of failures is equal to a failure quantity threshold, a next-order speed that is of the current sending speed and in the candidate speed set is selected and determined as a new current sending speed. The failure quantity threshold may be user-defined, for example, may be set to 10.

Therefore, the sending unit 405 may be further configured to resend the A-MPDU at the current sending speed when the quantity of sending failures for sending the A-MPDU at the current sending speed is less than the failure quantity threshold.

The sending unit 405 may be further configured to determine a next-order speed that is of the current sending speed and in the candidate speed set as a new current sending speed, and send the A-MPDU at the new current sending speed when the quantity of sending failures for sending the A-MPDU at the current sending speed is equal to the failure quantity threshold.

In addition, the sending apparatus may further include an adjustment unit 406 (in FIG. 4, a dotted box is used to indicate a unit that is further included), where the adjustment unit 406 is configured to adjust, according to the sending result, the packet sending success rate of the current sending speed, and the adjustment unit 406 may be further configured to adjust upward the packet sending success rate of the current sending speed when the A-MPDU is sent successfully or adjust downward the packet sending success rate of the current sending speed when the A-MPDU fails to be sent.

Values adjusted upward are different when the A-MPDU is sent successfully at the current sending speed at the first time and when the A-MPDU is sent successfully after multiple times. Therefore, further, the adjustment unit 406 is further configured to add a first value to the packet sending success rate of the current sending speed when the A-MPDU is sent successfully. Add a second value to the packet sending success rate of the current sending speed when a quantity of sending failures for sending the A-MPDU is less than a failure quantity threshold, where the first value is greater than the second value. An initial value of the packet sending success rate of the current sending speed is an upper limit value, and a packet sending success rate of the current sending speed after being added with the first value or the second value does not exceed the upper limit value. Hence, when the quantity of sending failures for sending the A-MPDU is equal to the failure quantity threshold, subtract a third value from the packet sending success rate of the current sending speed.

In order to prevent multiple sending failures from causing an excessively low packet sending success rate of each element in the basic speed set, the adjustment unit 406 may be further configured to adjust upward packet sending success rates of all basic speeds periodically. For example, a value may be added to original packet sending success rates of all basic speeds every 20 milliseconds, where a specific adjustment range may be user-defined.

According to this embodiment of the present disclosure, a maximum speed is dynamically selected from a basic speed set in which a packet sending success rate is greater than or equal to a packet sending success rate threshold to acquire an aggregation length value, and compared with that a minimum speed is always selected in the conventional solution, the aggregation length value is effectively increased. Therefore, a quantity of MPDUs in an A-MPDU can be increased. On the premise that MPDUs of a same quantity need to be sent, compared with the conventional solution, in the present disclosure, more MPDUs can be aggregated during each time of frame aggregation, and a quantity of times for sending the MPDUs can be effectively reduced, thereby effectively improving sending efficiency of the MPDUs.

Figure 5:
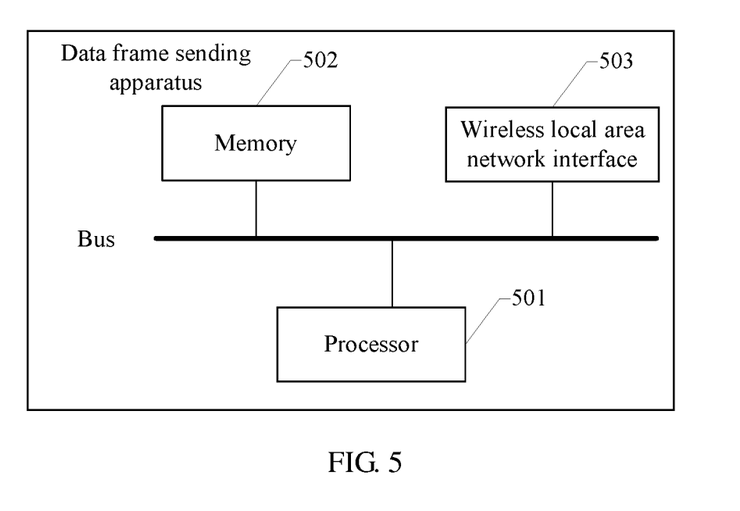
FIG. 5 is another schematic structural diagram of a data frame sending apparatus according to an embodiment of the present disclosure.

The present disclosure further provides an access point device, and a schematic structural diagram thereof is shown in FIG. 5. The access point device includes a processor 501, a memory 502, a wireless local area network interface 503, and the like. The processor 501 may be connected to the memory 502 and the wireless local area network interface 503 using a bus. The processor 501 is a WLAN communications chip. The WLAN communications chip is, for example, AR9580 or AR9344 from Qualcomm. The memory 502 may include a volatile memory, such as a random-access memory (RAM). The memory 502 may also include a non-volatile memory, such as a read-only memory (ROM), a flash memory, a hard disk drive (HDD), or a solid-state drive (SSD). The memory 502 may further include a combination of the foregoing types of memories. The wireless local area network interface 503 includes a radio frequency (RF) chip and an antenna.

The memory 502 is configured to store information such as a file essential to the processor 501 for data processing, and for example, program code, where the program code stored by the memory 502 in this embodiment is used to implement the foregoing data frame sending methods, and then the processor 501 executes the program code.

The processor 501 is further configured to acquire a basic speed set, determine a current sending speed, where the current sending speed is an element with a maximum speed in a candidate speed set, and the candidate speed set is a set of elements that are in the basic speed set and whose packet sending success rate is greater than or equal to a packet sending success rate threshold, acquire an aggregation length value according to the current sending speed, where the aggregation length value is a maximum length of a frame that can be sent at the current sending speed, determine multiple MPDUs from to-be-sent MPDUs according to the aggregation length value, and aggregate the multiple MPDUs to obtain an A-MPDU, where a length of the A-MPDU is less than or equal to the aggregation length value, and send the A-MPDU at the current sending speed through the wireless local area network interface 503.

Furthermore, when the A-MPDU fails to be sent at the current sending speed, and a quantity of sending failures is less than a failure quantity threshold, in this case, the processor 501 is further configured to resend the A-MPDU at the current sending speed. When the A-MPDU fails to be sent at the current sending speed, and a quantity of sending failures is equal to a failure quantity threshold, the processor 501 is further configured to determine a next-order speed that is of the current sending speed and in the candidate speed set as a new current sending speed, and send the A-MPDU at the new current sending speed.

In a specific embodiment, the processor 501 is further configured to adjust upward a packet sending success rate of a current sending speed when the A-MPDU is sent successfully or adjust downward a packet sending success rate of a current sending speed when the A-MPDU fails to be sent.

In a specific embodiment, the processor 501 is further configured to add a first value to the packet sending success rate of the current sending speed when the A-MPDU is sent successfully, and add a second value to the packet sending success rate of the current sending speed when a quantity of sending failures for sending the A-MPDU is less than a failure quantity threshold, where the first value is greater than the second value. The initial value of the packet sending success rate of the current sending speed is an upper limit value, and a packet sending success rate of the current sending speed after being added with the first value or the second value does not exceed the upper limit value. Hence, when the quantity of sending failures for sending the A-MPDU is equal to the failure quantity threshold, subtract a third value from the packet sending success rate of the current sending speed.

In the foregoing embodiments, different particular emphasis is placed on the descriptions of the embodiments. For a part that is not described in detail in an embodiment, reference may be made to related description in another embodiment.

A person of ordinary skill in the art may understand that all or some of the steps of the methods in the embodiments may be implemented by a program instructing a processor. The program may be stored in a computer-readable storage medium. The storage medium is a non-transitory medium, for example, a random access memory, a read-only memory, a flash memory, a hard disk, a solid state disk, a magnetic tape, a floppy disk, an optical disc, and any combination thereof.

The foregoing descriptions are merely exemplary implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data frame sending method, comprising:
   acquiring a basic speed set;
   determining a current sending speed, wherein the current sending speed is an element with a maximum speed in a candidate speed set, wherein the candidate speed set is a set of elements that are in the basic speed set, and wherein a packet sending success rate is greater than or equal to a packet sending success rate threshold of the current sending speed;
   acquiring an aggregation length value according to the current sending speed, wherein the aggregation length value is a maximum length of a frame that can be sent at the current sending speed;
   determining multiple medium access control protocol data units (MPDUs) from to-be-sent MPDUs according to the aggregation length value;
   aggregating the multiple MPDUs to obtain an aggregate MPDU (A-MPDU), wherein a length of the A-MPDU is less than or equal to the aggregation length value;
   sending the A-MPDU at the current sending speed;
   adding a first value to the packet sending success rate of the current sending speed when
   the A-MPDU is sent successfully at the current sending speed;
   adding a second value to the packet sending success rate of the current sending speed when a quantity of sending failures for sending the A-MPDU at the current sending speed is less than a failure quantity threshold, wherein the first value is greater than the second value, wherein an initial value of the packet sending success rate of the current sending speed is an upper limit value, and wherein the packet sending success rate of the current sending speed after being added with the first value or the second value does not exceed the upper limit value; and
   subtracting a third value from the packet sending success rate of the current sending speed when the quantity of sending failures for sending the A-MPDU at the current sending speed is equal to the failure quantity threshold.

2. The method according to claim 1, further comprising adjusting upward the packet sending success rate of the current sending speed when the A-MPDU is sent successfully.

3. The method according to claim 1, further comprising adjusting downward the packet sending success rate of the current sending speed when the A-MPDU fails to be sent.

4. The method according to claim 1, wherein when the A-MPDU fails to be sent at the current sending speed the method further comprises:
   determining the quantity of sending failures for sending the A-MPDU at the current sending speed; and
   resending the A-MPDU at the current sending speed when the quantity of sending failures is less than the failure quantity threshold.

5. The method according to claim 1, wherein when the quantity of sending failures is equal to the failure quantity threshold, the method further comprises:
   determining a next-order speed that is of the current sending speed, wherein the candidate speed set as a new current sending speed;
   acquiring a new aggregation length value according to the new current sending speed, wherein the new aggregation length value is a length of a frame that can be sent at the new current sending speed within a preset period of time;
   determining multiple new MPDUs from the to-be-sent MPDUs according to the new aggregation length value;
   aggregating the multiple new MPDUs to obtain a new A-MPDU, wherein a length of the new A-MPDU is less than or equal to the new aggregation length value; and
   sending the new A-MPDU at the new current sending speed.

6. A data frame sending apparatus, comprising:
   a processor configured to:
   acquire a basic speed set,
   determine a current sending speed, wherein the current sending speed is an element with a maximum speed in a candidate speed set, wherein the candidate speed set is a set of elements that are in the basic speed set, and wherein a packet sending success rate is greater than or equal to a packet sending success rate threshold;
   acquire an aggregation length value according to the current sending speed, wherein the aggregation length value is a maximum length of a frame that can be sent at the current sending speed;
   determine multiple medium access control protocol data units (MPDUs) from to-be-sent MPDUs according to the aggregation length value;
   aggregate the multiple MPDUs to obtain an aggregate MPDU (A-MPDU), wherein a length of the A-MPDU is less than or equal to the aggregation length value;
   add a first value to the packet sending success rate of the current sending speed when the A-MPDU is sent successfully;
   add a second value to the packet sending success rate of the current sending speed when a quantity of sending failures for sending the A-MPDU is less than a failure quantity threshold, wherein the first value is greater than the second value, wherein an initial value of the packet sending success rate of the current sending speed is an upper limit value, and wherein the packet sending success rate of the current sending speed after being added with the first value does not exceed the upper limit value;
   subtract a third value from the packet sending success rate of the current sending speed when the quantity of sending failures for sending the A-MPDU is equal to the failure quantity threshold; and a wireless network interface coupled to the processor and configured to send the A-MPDU at the current sending speed.

7. The apparatus according to claim 6, wherein the processor is further configured to:
adjust upward the packet sending success rate of the current sending speed when the A-MPDU is sent successfully; and
adjust downward the packet sending success rate of the current sending speed when the A-MPDU fails to be sent.

8. The apparatus according to claim 7, wherein the processor is further configured to resend the A-MPDU at the current sending speed when the quantity of sending failures for sending the A-MPDU at the current sending speed is less than the failure quantity threshold.

9. The apparatus according to claim 7, wherein the processor is further configured to:
determine a next-order speed that is of the current sending speed and in the candidate speed set as a new current sending speed when the quantity of sending failures for sending the A-MPDU at the current sending speed is equal to the failure quantity threshold;
acquire a new aggregation length value according to the new current sending speed, wherein the new aggregation length value is a length of a frame that can be sent at the new current sending speed within a preset period of time;
determine multiple new MPDUs from the to-be-sent MPDUs according to the new aggregation length value;
aggregate the multiple new MPDUs to obtain a new A-MPDU, wherein a length of the new A-MPDU is less than or equal to the aggregation length value; and
send the new A-MPDU at the current sending speed.

10. The apparatus according to claim 7, wherein the processor is further configured to determine the quantity of sending failures for sending the A-MPDU at the current sending speed when the A-MPDU fails to be sent at the current sending speed.

11. A data frame sending apparatus, comprising:
a processor configured to:
acquire a basic speed set,
determine a current sending speed, wherein the current sending speed is an element with a maximum speed in a candidate speed set, wherein the candidate speed set is a set of elements that are in the basic speed set, and wherein a packet sending success rate is greater than or equal to a packet sending success rate threshold;
acquire an aggregation length value according to the current sending speed, wherein the aggregation length value is a maximum length of a frame that can be sent at the current sending speed;
determine multiple medium access control protocol data units (MPDUs) from to-be-sent MPDUs according to the aggregation length value;
aggregate the multiple MPDUs to obtain an aggregate MPDU (A-MPDU), wherein a length of the A-MPDU is less than or equal to the aggregation length value;

add a first value to the packet sending success rate of the current sending speed when the A-MPDU is sent successfully;
add a second value to the packet sending success rate of the current sending speed when a quantity of sending failures for sending the A-MPDU is less than a failure quantity threshold, wherein the first value is greater than the second value, wherein an initial value of the packet sending success rate of the current sending speed is an upper limit value, and wherein the packet sending success rate of the current sending speed after being added with the second value does not exceed the upper limit value;
subtract a third value from the packet sending success rate of the current sending speed when the quantity of sending failures for sending the A-MPDU is equal to the failure quantity threshold; and
a wireless network interface coupled to the processor and configured to send the A-MPDU at the current sending speed.

12. The apparatus according to claim 11, wherein the processor is further configured to:
adjust upward the packet sending success rate of the current sending speed when the A-MPDU is sent successfully; and
adjust downward the packet sending success rate of the current sending speed when the A-MPDU fails to be sent.

13. The apparatus according to claim 12, wherein the processor is further configured to determine the quantity of sending failures for sending the A-MPDU at the current sending speed when the A-MPDU fails to be sent at the current sending speed.

14. The apparatus according to claim 12, wherein the processor is further configured to resend the A-MPDU at the current sending speed when the quantity of sending failures for sending the A-MPDU at the current sending speed is less than the failure quantity threshold.

15. The apparatus according to claim 12, wherein the processor is further configured to:
determine a next-order speed that is of the current sending speed and in the candidate speed set as a new current sending speed when the quantity of sending failures for sending the A-MPDU at the current sending speed is equal to the failure quantity threshold;
acquire a new aggregation length value according to the new current sending speed, wherein the new aggregation length value is a length of a frame that can be sent at the new current sending speed within a preset period of time;
determine multiple new MPDUs from the to-be-sent MPDUs according to the new aggregation length value;
aggregate the multiple new MPDUs to obtain a new A-MPDU, wherein a length of the new A-MPDU is less than or equal to the aggregation length value; and
send the new A-MPDU at the current sending speed.

* * * * *